United States Patent
Olander et al.

(10) Patent No.: US 7,614,421 B2
(45) Date of Patent: *Nov. 10, 2009

(54) PRESSURE-BASED GAS DELIVERY SYSTEM AND METHOD FOR REDUCING RISKS ASSOCIATED WITH STORAGE AND DELIVERY OF HIGH PRESSURE GASES

(75) Inventors: W. Karl Olander, Indian Shores, FL (US); Matthew B. Donatucci, Bethel, CT (US); Luping Wang, Brookfield, CT (US); Michael J. Wodjenski, New Milford, CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 202 days.

This patent is subject to a terminal disclaimer.

(21) Appl. No.: 11/360,732

(22) Filed: Feb. 23, 2006

(65) Prior Publication Data

US 2006/0174944 A1    Aug. 10, 2006

Related U.S. Application Data

(63) Continuation of application No. 11/062,509, filed on Feb. 22, 2005, now Pat. No. 7,328,716, which is a continuation of application No. 10/166,242, filed on Jun. 10, 2002, now Pat. No. 6,857,447.

(51) Int. Cl.
*F16K 3/36* (2006.01)
*B08B 9/027* (2006.01)
*G05B 11/01* (2006.01)

(52) U.S. Cl. .................... 137/487.5; 137/240; 137/486; 137/551; 134/95.1; 134/98.1; 134/171; 222/148

(58) Field of Classification Search ..................... 137/2, 137/15.04, 240, 486, 487.5, 551; 134/95.1, 134/167 C, 98.1, 171; 222/148
See application file for complete search history.

(56) References Cited

U.S. PATENT DOCUMENTS

| 4,076,176 | A | * | 2/1978 | Torrence ..................... 241/30 |
| 4,202,180 | A | * | 5/1980 | Cox ........................... 137/13 |
| 4,597,406 | A | | 7/1986 | Loiseau et al. |
| 4,723,967 | A | | 2/1988 | Tom |
| 4,744,384 | A | | 5/1988 | Nakamura et al. |

(Continued)

FOREIGN PATENT DOCUMENTS

EP    1 180 638 A2    2/2002

*Primary Examiner*—Kevin L Lee
(74) *Attorney, Agent, or Firm*—Steven J. Hultquist; Intellectual Property/Technology Law; Chih Sheng Lin (57) ABSTRACT

Apparatus and method for dispensing a gas using a gas source coupled in selective flow relationship with a gas manifold. The gas manifold includes flow circuitry for discharging gas to a gas-using zone, and the gas source includes a pressure-regulated gas source vessel containing the gas at superatmospheric pressure. The pressure-regulated gas source vessel can be arranged with a pressure regulator at or within the vessel and a flow control valve coupled in flow relationship to the vessel, so that gas dispensed from the vessel flows through the regulator prior to flow through the flow control valve, and into the gas manifold. The apparatus and method permit an enhancement of the safety of storage and dispensing of toxic or otherwise hazardous gases used in semiconductor processes.

62 Claims, 4 Drawing Sheets

U.S. PATENT DOCUMENTS

| | | |
|---|---|---|
| 5,240,024 A | 8/1993 | Moore et al. |
| 5,518,528 A | 5/1996 | Tom et al. |
| 5,601,107 A | 2/1997 | Moore et al. |
| 5,657,254 A | 8/1997 | Sierk et al. |
| 5,704,965 A | 1/1998 | Tom et al. |
| 5,704,967 A | 1/1998 | Tom et al. |
| 5,707,424 A | 1/1998 | Tom et al. |
| 5,727,589 A | 3/1998 | Yogoki |
| 5,917,140 A | 6/1999 | Tom |
| 5,935,305 A | 8/1999 | Tom et al. |
| 5,937,895 A | 8/1999 | Le Febre et al. |
| 6,007,609 A | 12/1999 | Semerdjian et al. |
| 6,089,027 A | 7/2000 | Wang et al. |
| 6,101,816 A | 8/2000 | Wang et al. |
| 6,132,492 A | 10/2000 | Hultquist et al. |
| 6,155,289 A | 12/2000 | Carlsen et al. |
| 6,257,000 B1 | 7/2001 | Wang |
| 6,298,515 B1 | 10/2001 | Robinson |
| 6,302,139 B1 | 10/2001 | Dietz |
| 6,314,986 B1 | 11/2001 | Zheng et al. |
| 6,561,213 B2 | 5/2003 | Wang et al. |
| 6,581,623 B1 | 6/2003 | Carpenter et al. |
| 6,857,447 B2 | 2/2005 | Olander et al. |
| 2001/0029979 A1 | 10/2001 | Zheng et al. |

\* cited by examiner

FIG.3A  PT=PRESSURE TRANSDUCER
PS=PRESSURE SWITCH

FIG. 3B

PRESSURE-BASED GAS DELIVERY SYSTEM AND METHOD FOR REDUCING RISKS ASSOCIATED WITH STORAGE AND DELIVERY OF HIGH PRESSURE GASES

CROSS-REFERENCE TO RELATED APPLICATIONS

This is a continuation of U.S. patent application Ser. No. 11/062,509 filed Feb. 22, 2005, now U.S. Pat. No. 7,328,716 issued Feb. 12, 2008 in the names of W. Karl Olander, et al., which in turn is a continuation of U.S. patent application Ser. No. 10/166,242 filed Jun. 10, 2002, now U.S. Pat. No. 6,857,447 issued Feb. 22, 2005 in the names of W. Karl Olander et al. The disclosures of said prior applications are hereby incorporated herein by reference in their respective entireties.

BACKGROUND OF THE INVENTION

1. Field of the Invention

The present invention relates generally to a pressure-based gas delivery system and methodology for reducing the risks associated with storage and delivery of high-pressure compressed gases.

2. Description of the Related Art

Throughout its development, the semiconductor industry has required reliable sources of high purity gases. In the semiconductor manufacturing plant, the delivery of such high purity gases involves flow circuitry for coupling gas supply vessels with semiconductor process tools and/or other gas-consuming chambers or regions in the facility.

Beginning in the 1970's, high purity gas delivery manifolds were developed and refined, and gas cabinets fabricated according to standard designs, with high integrity welds and improved control systems, came into common usage. Concurrently, ventilation specifications, electrical regulations, alarms and component arrays became standardized. Gas flow circuitry evolved into commonly accepted arrangements with respect to pressure transducers, pneumatically operated valves, regulators, high flow valves, couplings and the methodologies employed to effect change-outs of gas supply vessels.

Around 1980, the restricted flow orifice (RFO) was introduced and standardized, and became a commonly accepted component of gas delivery manifolds and flow circuitry.

The foregoing developments have enabled standards and regulations to be adopted for the semiconductor industry. Today the Uniform Fire Code and a number of industry authorities prescribe methods for the storage and delivery of toxic, corrosive and pyrophoric gases that are employed in semiconductor manufacturing operations.

The U.S. Department of Transportation (DOT) approves vessels that are used to supply gases for use in semiconductor manufacturing facilities. The DOT-approved gas cylinders commonly used for transport and delivery of hazardous gases for semiconductor manufacturing are by themselves intrinsically safe. The incidence of catastrophic failure of such DOT-approved gas cylinders is very low, e.g., on the order of once every 10,000 years of operation.

Gas cylinder burst pressure is normally set at $5/3$ times the maximum operating pressure of the cylinder. A gas cylinder preferably will have a burst pressure of at least about 4000 psig and burst pressures above 5000 psig are typical. The currently used stainless steel valves for such gas cylinders are extremely reliable, with no reported instances of valve shearing. Cylinders are pressure tested on a prescribed basis at the time of their initial manufacture and at the time of their (re)filling, to ensure their integrity. Cylinder valves, by contrast, require constant rebuilding and have a finite lifetime.

The methodology for gas delivery in the semiconductor manufacturing facility (fab) is of a routine and established nature. A high-pressure gas cylinder is connected to a gas delivery manifold and high-pressure gas admitted into the gas manifold panel. A gas regulator mounted on the panel reduces the gas pressure and the resulting pressure-modulated gas flow is transmitted into the fab. The gas stream can be split, using a valve manifold box (VMB) located near the semiconductor process tools, so that gas is distributed to a number of process tools in the fab. Additional gas regulators may be employed at the VMB and/or process tool.

The development of adsorbed-phase gas sources, of the type disclosed in U.S. Pat. No. 5,518,528, has somewhat altered this methodology. Gases can be stored at sub-atmospheric pressure and, as is the case with SDS® gas sources (commercially available from ATMI, Inc., Danbury, Conn.) commonly employed in ion implant applications, used over pressure ranges from on the order of 650 torr down to 10-20 torr. The use of such sub-atmospheric pressure gas sources requires corresponding accommodation in the ambient pressure environment of the fab. For example, dedicated gas cabinet products such as the RPM™ gas cabinet (commercially available from ATMI, Inc., Danbury, Conn.) have been developed to ensure that fab process systems operating at atmospheric pressure are not compromised by ambient air being drawn into the sub-atmospheric pressure cylinders and manifolds. Such gas cabinets are provided with monitoring and control componentry for comparing differential pressures within the gas delivery system and isolating the gas cylinder should a "high pressure wave" occur.

The development of pre-regulated pressure gas sources, such as those described in U.S. Pat. Nos. 6,089,027 and 6,101,816, represents a fundamental departure from the use of conventional high-pressure gas cylinders and presents the opportunity to reduce the risk of using compressed gases. In such pre-regulated pressure gas sources, a gas regulator element or assembly is deployed at the valve head or within the gas cylinder, so that gas is maintained in the cylinder at an elevated pressure, but is dispensed at a pressure determined by the regulator. The regulator controlled gas pressure may be substantially lower than the containment pressure of the bulk gas in the vessel, so that gas dispensing at moderate superatmospheric pressure, near-atmospheric pressure, or even sub-atmospheric pressure, is enabled.

Whereas, in conventional practice using compressed gas cylinders, gas at full cylinder pressure, e.g., up to 2000 psig, is admitted to the gas delivery manifold, the use of the pre-regulated pressure gas sources now makes it possible to admit a nominally positive, e.g., 20-100 psig, or sub-atmospheric pressure gas in its place. The pre-regulated pressure gas sources thus are a significant development in the semiconductor industry and provide the basis for operating a safer gas delivery system.

The consequences of this development are significant. Since many accidents occur during cylinder change-out or are associated with failure of components in the gas delivery system, the capability of reducing pressure within or at the cylinder limits the magnitude of an incident and the associated release. Pre-regulated pressure gas sources also provide another substantial advantage. If the pressure rises above a pre-established threshold level in the gas delivery system, evidencing an abnormal occurrence in the system, the system controller can quickly initiate auto-shutdown steps including closing the pneumatic valve on the gas cylinder, closing the high pressure isolation valve(s) on the manifold, and actuating system alarm(s).

In general, it is necessary to maintain the contents of high-pressure gas cylinders safely confined in the cylinder and to control the delivery of the dispensed gas in an efficient manner comporting with safety concerns, since many of the gases used in semiconductor manufacturing are toxic or otherwise hazardous in character.

The art continues to seek improvements in safety and reliability of gas sources and their methods of use.

SUMMARY OF THE INVENTION

The present invention relates generally to apparatus and method for dispensing gases in industrial processes such as semiconductor manufacturing.

In one apparatus aspect, the invention relates to a gas dispensing assembly for dispensing gas, comprising:
  (a) a pressure-regulated gas source vessel holding gas at superatmospheric pressure and constructed and arranged for discharging the gas at substantially lower pressure;
  (b) a gas manifold arranged to receive discharged gas from the pressure-regulated gas source vessel and comprising gas flow circuitry for dispensing said gas;
  (c) means for selectively isolating the flow circuitry of the gas manifold from the pressure-regulated gas source vessel; and
  (d) means for removing gas from the gas flow circuitry to enable change-out of the gas source vessel when the vessel has become depleted of gas.

In another apparatus aspect, the invention relates to a gas dispensing assembly for dispensing gas to a use location. The gas dispensing assembly includes:
  (a) a gas source vessel for holding gas at superatmospheric pressure, with at least one pressure regulator at or within the vessel, and a flow control valve coupled to the vessel, wherein the at least one pressure regulator and the flow control valve are arranged so that gas discharged from the gas source vessel flows through the at least one pressure regulator prior to flow through the flow control valve;
  (b) a gas manifold arranged to receive gas from the gas source vessel and comprising gas flow circuitry for dispensing gas; and
  (c) means for removing gas from the gas flow circuitry to enable change-out of the gas source vessel when the vessel has become depleted of gas.

In one method aspect, the present invention relates to a method of operating a gas dispensing assembly including a gas source therein coupled in selective flow relationship with a gas manifold, wherein the gas manifold includes flow circuitry for discharging gas to a gas-using zone, said method comprising using as the gas source a pressure-regulated gas source vessel containing the gas at superatmospheric pressure, wherein the pressure regulator is constructed and arranged to provide a gas pressure in said manifold that is substantially below the pressure of the superatmospheric pressure gas in the gas source vessel.

In another method aspect, the invention relates to a method of operating a gas source coupled in selective flow relationship with a gas manifold, wherein the gas manifold includes flow circuitry for discharging gas to a gas-using zone, said method comprising using as the gas source a gas source vessel containing the gas at superatmospheric pressure, with a pressure regulator at or within the vessel and a flow control valve coupled in flow relationship to the vessel, wherein the pressure regulator and the flow control valve are arranged so that gas dispensed from the vessel flows through said regulator prior to flow through said flow control valve, and into said gas manifold, wherein the pressure regulator is constructed and arranged to provide a gas pressure in said manifold that is substantially below (at least 25%, preferably at least 40%, more preferably at least 60%, and most preferably at least 80% below) the pressure of the superatmospheric pressure gas in the gas source vessel.

A further apparatus aspect of the invention relates to a gas dispensing system including a pressure-regulated source gas vessel coupled in gas feed relationship to a gas manifold for dispensing the gas to a semiconductor process, wherein pressure of gas in the manifold is at least 40% lower than pressure of gas in the pressure-regulated source gas vessel, and the pressure-regulated source gas vessel comprises a container defining an interior volume for holding said gas therein, and a head assembly mounted on the container, wherein the pressure-regulated source gas vessel includes a gas pressure regulator interiorly disposed in the interior volume of the container, and the head assembly includes a flow control valve, whereby gas flowed from the pressure-regulated source gas vessel to the gas manifold flows through said gas pressure regulator prior to flow through said flow control valve in said head assembly, and wherein said gas dispensing system, in relation to a corresponding gas dispensing system including a source gas vessel that is not pressure regulated, has at least one of the following characteristics:
  (I) a smaller sized source gas vessel;
  (II) a reduced ventilation gas requirement;
  (III) an increased on-stream dispensing capability; and
  (IV) an increased service life.

The invention may be carried out in various modes and conformations, as discussed more fully hereinafter, including dispensing of superatmospheric pressure gas, dispensing of sub-atmospheric pressure gas, and hybrid operation involving dispensing of gas at superatmospheric pressure that is further regulated down to subatmospheric pressure, as hereinafter described in greater detail.

The gas source vessel and manifold in the practice of the invention may be disposed in a gas cabinet, or alternatively may be provided as a unitary assembly in an "open air" manifold system, wherein the gas manifold is mounted on a unistrut wall, rack, gas panel board, or other support structure, and the gas source vessel is coupled to same.

In other aspects of the invention, the gas dispensing system may be constituted to employ a gas source vessel employing pressure regulation of the dispensed gas, wherein the gas source vessel has an associated valve head assembly including a gas pressure regulator device, e.g., a vessel employing a regulator after the primary vessel valve, as an integrated valve head assembly, optionally with a manual isolation valve after the regulator, so that gas flows in turn through the primary vessel valve, pressure regulator and the manual isolation valve. The manual isolation valve in such assembly may be integrated in the valve head assembly on the gas source vessel.

Examples of alternative gas source vessels that may be employed in the practice of the invention are the vessels disclosed in U.S. Pat. Nos. 6,314,986; 5,937,895; and 6,007,609, and in EP 1 180 638 A2.

Other aspects, features and embodiments of the invention will be more fully apparent from the ensuing disclosure and appended claims.

DETAILED DESCRIPTION OF THE INVENTION AND PREFERRED EMBODIMENTS THEREOF

The disclosures of the following patent applications and patents are hereby incorporated herein by reference in their entireties:

U.S. Pat. No. 6,132,492 issued Oct. 17, 2000;
U.S. Pat. No. 5,935,305 issued Aug. 10, 1999;
U.S. Pat. No. 5,518,528 issued May 16, 1996;
U.S. Pat. No. 5,704,965 issued Jan. 6, 1998;
U.S. Pat. No. 5,704,967 issued Jan. 6, 1998;
U.S. Pat. No. 5,707,424 issued Jan. 13, 1998;
U.S. Pat. No. 5,917,140 issued Jun. 29, 1999;
U.S. Pat. No. 6,101,816 issued Aug. 15, 2000;
U.S. Pat. No. 6,155,289 issued Dec. 5, 2000;
U.S. Pat. No. 6,089,027 issued Jul. 18, 2000;
U.S. patent application Ser. No. 09/522,347 filed Apr. 19, 2000, now U.S. Pat. No. 6,298,515 issued Oct. 8, 2001; and
U.S. patent application Ser. No. 09/874,084 filed Jun. 5, 2001, now U.S. Pat. No. 6,561,213 issued May 13, 2003.

The present invention provides a low elevated pressure or sub-atmospheric pressure storage and delivery system apparatus as a source gas supply means for applications involving semiconductor processing, such as etch cleaning of process equipment using halide gases, chemical vapor deposition using gaseous precursor compounds, dopant delivery of dopant gases or precursors for gaseous dopant species, ion implantation of hydride and halide gases, and organometallic Group V compounds, e.g., arsine, phosphine, chlorine, $NF_3$, $BF_3$, $BCl_3$, diborane ($B_2H_6$ and its deuterium analog, $B_2D_6$), HCl, HBr, HF, HI, tungsten hexafluoride, and $(CH_3)_3Sb$.

Reducing gas pressure of the dispensed gas in accordance with the invention substantially extends the lifetime performance of valves and regulators that are utilized for delivery of gas from the gas source (storage and dispensing) vessel. At reduced pressures, connections are easier to make leak-tight, pressure surges are reduced or even eliminated, and valves are able to seal more effectively, thereby reducing leakage and particle generation. Further, purge/vent cycles are enhanced in efficiency as a result of reduced material that must be removed during the purging or venting operation.

Componentry of the gas dispensing equipment has improved operating life by reduction of pressure, and the safety of operation is enhanced not only by reduced pressure levels which will result in less dispersion of gas into the ambient environment in the event of a leak, but also increased equipment reliability that will itself minimize such leak or failure events in the gas supply system.

The gas storage and dispensing vessel utilized in the practice of the present invention may be of any suitable type, including conventional high-pressure cylinder vessels, whose thickness and over-design for containment of gas at high pressure further increases the safety of operation when retaining the gas to be dispensed (i.e., the "working gas") at lower or sub-atmospheric pressure. The gas storage and dispensing vessel may be equipped with a valve head assembly including fill and discharge ports, over-pressure relief means such as a pop valve, burst disk, or other over-pressure relief means, fluid regulators and flow control elements such as valves of manual or automatic character, couplings for connection to flow circuitry or other dispensing means for conveying the dispensed gas to a locus of use, etc.

The vessel used for supply of the working gas in the practice of the invention is a pressure-regulated vessel. As used herein, the term "pressure-regulated" in reference to a gas source vessel refers to a vessel including a container portion enclosing an interior volume containing the gas to be dispensed, and having a port for discharging gas from the interior volume, with a gas regulator device at or within the vessel, i.e., the gas regulator is disposed in the interior volume of the vessel, or otherwise is disposed at the port of the container portion (for example, the regulator may be partially within the interior volume, and partially in the neck opening of the vessel, or protruding from the neck opening of the vessel), or is in a head assembly that is mounted on the vessel. The head assembly may include a unitary block or other structure containing flow passages and ancillary elements therein constituting regulator and valve components of the head assembly. The regulator in a preferred aspect of the invention is arranged so that gas dispensed from the vessel flows through the regulator, prior to flow through flow control elements such as valves, mass flow controllers, ejectors, eductors, etc.

Vessels of such type are disclosed in U.S. Pat. Nos. 6,101,816 and 6,089,027, and are commercially available, for a variety of semiconductor processing gases, from ATMI, Inc. (Danbury, Conn.).

The gas source vessel may alternatively be of a type having a vessel shut-off valve positioned upstream of a regulator that in turn is upstream of a vessel flow control valve that can be modulated to vary the flow of the gas, in a shut-off valve/regulator/flow control valve arrangement, and such components may for example be integrated in a valve head assembly for the gas source vessel, or otherwise associated with the vessel.

The vessel has an outlet port, e.g., in a valve head assembly coupled to the gas source vessel, and restricted flow orifice (RFO) elements are provided at the gas outlet port in preferred practice, for enhancing the safety of vessel operation.

A single gas source vessel may be provided as coupled to a manifold in the practice of the invention, or alternatively a plurality of vessels of such type may be employed in an array, thereby accommodating change-out of a spent vessel at a point of depletion of the gas contents thereof, and commencement of on-stream operation with a full backup vessel in the array. For this purpose, multiple vessels may be installed in a gas cabinet or otherwise coupled to a gas manifold, with an auto-switching system being employed to automatically switch over the vessels to maintain continuous operation of the gas dispensing system when a first on-stream vessel becomes depleted of gas.

The flow control valve on the gas source vessel (as well as the shut-off valve in the shut-off valve/regulator/flow control valve arrangement discussed hereinabove) preferably are pneumatic valves in the practice of the present invention, to facilitate automatic operation using compressed air or other actuating gas in the gas dispensing system. Such valving also enables two-point isolation in the system, one isolation point being defined by the gas source vessel valve and the other point of isolation being the manifold isolation valve that is characteristically used in the flow circuitry where the gas source vessel dispensing line connects with the gas manifold.

The gas supply system of the present invention is usefully employed to deliver any suitable semiconductor processing gases, including gases used in the manufacturing of semiconductor devices and precursor structures therefor, as well as gases that are used for cleaning or process chambers and flow circuitry, as well as gases that are used in abatement of effluent streams deriving from semiconductor manufacturing operations. Although primarily described herein in reference to delivery of gases for semiconductor processing applications, the utility of the present invention is not thus limited, and the gas supply system of the present invention may be utilized for other applications in which gas is consumed. Illustrative examples of such alternative applications include, without limitation, welding systems, underwater breathing apparatus, anti-terrorism building purge gas systems, oil well fire suppression systems, hydrogen-powered vehicles, chemical storage and dispensing facilities (e.g., storing chemical agents, nerve gas and airborne materials), and agricultural fruit ripening systems, to name a few.

The invention may therefore be employed for delivery of gases such as boron trifluoride, silane, methylsilane, trimethylsilane, arsine, phosphine, diborane, chlorine, $BCl_3$, $B_2D_6$, tungsten hexafluoride, hydrogen fluoride, hydrogen chloride, hydrogen iodide, hydrogen bromide, germane, ammonia, stibine, hydrogen sulfide, hydrogen selenide, hydrogen telluride, and corresponding and other halide (chlorine, bromine, iodine, and fluorine) gaseous compounds such as $NF_3$, and organometallic compounds, e.g., Group V compounds such as $(CH_3)_3Sb$ in semiconductor processing operations, and gases such as hydrocarbon gases, hydrogen, methane, nitrogen, carbon monoxide, and rare gas halides in other applications.

Although the invention is primarily described in connection with semiconductor processing applications wherein a single gas species is stored and dispensed from the gas source vessel, it will be understood that the utility of the invention is not thus limited, but rather extends to and encompasses the storage and dispensing of multicomponent gas mixtures.

The present invention provides an enhanced safety gas supply system, utilizing a gas source including a cylinder or other fluid storage and dispensing vessel in which a fluid at elevated pressure is pressure-regulated, by a pressure regulator device or assembly, within or at the cylinder. Since such pressure regulation within or at the cylinder has not been the normal operating arrangement for high-pressure gases, the gas supply system of the invention represents a departure from the prior art practice in which high pressure gases are throttled or otherwise regulated at the semiconductor process tool or chamber in which the gas is used, or otherwise downstream from the gas source.

The invention in a preferred embodiment employs an additional regulator in the gas dispensing manifold, as a back-up for the pressure regulator associated with the gas source vessel, and to provide secondary pressure adjustment closer to what is required by the gas-using process that is being supplied from the gas source vessel in the gas supply system. Such a "second stage" regulator diminishes the "supply pressure effect" as the gas source vessel pressure and gas inventory are depleted in use.

As used in such context, the term "additional" in reference to the gas pressure regulator in the gas manifold, refers to the fact that such manifold regulator is in addition to the at least one pressure regulator that is integrated with the gas source vessel. The term "integration" and "integrated" in reference to the pressure regulator(s) associated with the gas source vessel means that such regulator(s) are at least partially interiorly disposed in the vessel interior volume and/or are provided in a head assembly of the vessel that is mounted on the vessel's gas container portion so that the valve(s) and pressure regulator(s) of the head assembly are coupled in gas flow communication with the interior gas-holding volume of the container portion of the vessel.

The present invention in one embodiment utilizes a gas source vessel having a pressure regulator deployed at or within the vessel so that gas being dispensed will flow through the regulator prior to flowing through any gas flow control elements such as gas dispensing valves. The invention thus provides a gas source vessel with an associated integrated pressure reduction function, and such gas supply system may utilize pressure as part of a shutdown and control methodology in a novel and effective manner, as hereinafter more fully described. The advantages of the invention include its capability for reducing the risks of using hazardous production materials such as silane, silane mixtures, phosphine, arsine, carbon monoxide, silicon tetrafluoride, to name but a few, by about an order of magnitude or more. The volume and mass of material in the gas supply manifold is reduced in the practice of the invention in direct proportion to the reduced gas pressure, so that the amount of the material present in the manifold and dispersible into the ambient environment in the event of a leakage event is substantially reduced, in relation to current high-pressure gas supply systems. By rigorously limiting the maximum operating pressure that is permissible in the operation of the gas supply system, the gas supply system of the invention enables pressure to be used in a hitherto-unavailable manner, to limit the potential and/or magnitude of a gas release event.

When the gas supply system of the invention is operated in a sub-atmospheric pressure mode, an additional safety control method is available. Such sub-atmospheric pressure operation has the benefit that any leaks in the system will be "inboard" or inflowing to the flow circuitry until ambient (e.g., atmospheric) pressure equilibration in the flow circuitry is achieved, following which the leakage outwardly of the dispensing gas will be diffusional and thus extremely slow in character.

The gas supply system of the invention in one embodiment operates to isolate the gas supply cylinder if the gas supply manifold pressure exceeds a predetermined pressure, e.g., becomes slightly positive in gauge pressure, such as 5 psig, in a system wherein gas is dispensed from the gas supply cylinder at sub-atmospheric pressure. Such cylinder isolation feature greatly reduces the risk that the cylinder contents will reach the environment and pose a heath and/or safety issue. In a further embodiment, the system may be constructed and arranged so that a pneumatic valve on a cylinder does not open for dispensing of gas, unless a negative pressure is established in the gas supply manifold. This ensures that the hazardous gas contents remain in the cylinder unless a safe dispensing condition exists.

In various embodiments of the invention, redundancy is provided by use of multiple pressure sensing elements, e.g., pressure transducers, or pressure switches, in the gas flow circuitry. As a further variation, a regulator of the type associated with the gas source vessel, or other type of regulator, may be deployed in the flow circuitry near the process gas outlet of the manifold, inside the gas cabinet enclosure. Such additional regulator provides an added level of protection against the introduction of gas at the internal elevated pressure of the gas source vessel, outside of the cabinet, in the event of failure of the regulator that is associated with the gas source vessel.

Operation of the gas supply system for dispensing of gas at sub-atmospheric pressure also has other benefits. For example, a conventional high-pressure cylinder gas supply system typically utilizes a dedicated cylinder of purge gas, e.g., nitrogen. With sub-atmospheric pressure operation, the requirement of a dedicated $N_2$ purge gas cylinder can in many instances be eliminated. The pneumatic valve on the gas cylinder containing the semiconductor processing gas to be dispensed remains closed during purging, and set point regulators (SPRs) are used in the pressure-regulated gas source vessel in the practice of the invention which do not open even at high exterior pressures (e.g., >2000 psig), so the prospect of admitting a hazardous gas from the working gas cylinder into the purge nitrogen system is negligible. As a result, the gas supply system can employ a gas cabinet that is smaller, less complex and requires a lower ventilation rate in normal operation than a gas cabinet employing a conventional high-pressure gas cylinder lacking the pressure regulation characteristic of the system of the present invention.

As a further advantage of the gas supply system of the invention, the gas cabinet ventilation rate can be reduced proportionately to the magnitude of the expected worst case operational release, in addition to the aforementioned reduction in the ventilation rate incident to the reduced size of the gas cabinet relative to a corresponding conventional high-pressure gas cylinder system.

Still further, the insurance rates for the fab can be reduced as a consequence of the enhanced safety operation enabled by the system of the present invention, and the placement and the distance of the gas room from the semiconductor process tools can be optimized as a consequence of the reduction of the high-pressure material risks.

Operating at reduced pressure in accordance with the present invention provides the additional advantage that the adverse effects on flow circuitry components of pressure surges, which can severely shorten component service life, are minimized, relative to conventional high-pressure operation.

In another embodiment of the invention, pressure-controlled gas delivery is carried out, with setting of the pressure-regulated cylinder (by setting or adjustment of the set point of the regulator) to a nominal positive pressure, as for example 10-100 psig, and placing the pressure set point of the high pressure alarm in the system at a pressure that is 10-20 psig above the selected operating pressure, for triggering of system shutdown.

As a specific illustrative example, the invention was evaluated in a semiconductor fab involving delivery of silane from a VAC® pressure-regulated vessel deployed in a gas cabinet, wherein the gas cabinet was modified to actuate an alarm when the pressure in the flow circuitry therein reached 10 psig.

A still further embodiment of the invention utilizes a further regulator in the gas delivery panel, in addition to the regulator at or within the gas cylinder, as a means to further modulate the pressure of the gas for delivery into the fab. In such manner, the gas delivery panel regulator acts as a second stage regulator for gas dispensing, and also provides a back-up safety measure, in the unlikely event that a regulator at or within the gas cylinder should malfunction.

The invention is susceptible of implementation in various embodiments wherein pneumatic valves are used with and/or on the gas cylinder. Applications of such type include ion implant gas boxes, standard gas cabinets, free-standing gas manifolds where gas cabinets are not employed, bulk delivery systems such as 450 liter cylinders, and tube trailers.

The gas storage and dispensing system of the invention may be arranged for dispensing of gas at a desired low super-atmospheric pressure or at a sub-atmospheric pressure, at a fixed flow rate, by use of a restrictive flow orifice in the gas dispensing flow path that matches the process requirements for the dispensed gas. The regulator in or at the vessel is normally closed and flow only occurs when the delivery manifold flow circuitry downstream from the gas storage and dispensing vessel matches the threshold operating pressure.

The regulator employed in the practice of the present invention may be a single regulator, or an assembly of two or more regulators, and the set point of each such regulator may be fixed or adjustably variable in character. The use of a set point regulator arrangement eliminates the potential for accidental backfilling of purge gas into the gas source vessel while the vessel is coupled into the manifold gas flow circuit, when dispensing of sub-atmospheric pressure gas from the manifold gas flow circuit to the downstream process. If the set point regulator associated with the gas source vessel is set for superatmospheric pressure gas dispensing, e.g., at 100 psig, the pressure of the purge gas should exceed the set point pressure of the regulator on the gas source vessel, to ensure that the set point regulator remains closed, thereby avoiding any accidental backfill.

The set pressure regulator may by way of illustration be of a type employing a pressure sensing apparatus [PSA] such as a welded bellows diaphragm to regulate flow of gas, wherein the PSA reacts to a downstream delivery pressure and adjusts the position of a tapered poppet or corresponding element in the gas flow path. The PSA unit is desirably calibrated and sealed during manufacture of the regulator apparatus.

The gas storage and dispensing vessel may thus utilize a single stage or a double stage internal regulator, arranged so that the dispensed gas flows through the regulator before it enters the valve head and flows through the valve therein. The pressure-regulated vessel may be employed in conjunction with additional regulator(s) in the gas cabinet containing the gas storage and dispensing vessel, in which at least one additional regulator is disposed downstream from the vessel in the manifold flow circuitry in the gas cabinet, to thereby provide multiple stage regulator performance and pressure control in the vessel as well as exteriorly thereof.

It will be appreciated that the gas storage and dispensing system may be modified, with positioning of the regulator in the valve head or in the neck or other portion of the interior volume of the vessel, upstream of the flow control valve. It is preferred in practice to deploy the regulator at least partially within the interior volume of the gas source vessel, to thereby protect the regulator from shock, impact and vibration during storage, transport and use of the vessel, as well as to realize the performance and safety benefits of positioning the regulator upstream of the flow control valve.

The gas pressure regulator devices useful in the broad practice of the invention can be of any suitable type. Preferred regulators include the Swagelok® HF series of set pressure regulators (commercially available from Swagelok Company, www.swagelok.com), having a set point pressure in a range of from vacuum levels to pressures on the order of 2550 psig. The use of high-precision regulators permits gas to be reliably dispensed from the pressure-regulated vessel, at the desired set point pressure level.

The gas pressure regulator in general is preferably of a poppet valve type, comprising a poppet element that is biased to a seat structure to prevent flow at a pressure above the set point value. Such regulator uses a gas-actuated pressure-sensing assembly that accommodates changes in outlet pressure by responsive expansion/contraction of the pressure-sensing assembly and translation of the poppet, to maintain the set point pressure.

To simulate long term operation of gas storage and dispensing systems according to the invention, four regulators (Swagelok® HF series set pressure regulators, commercially available from the Swagelok Company) were simultaneously tested over a course of 750,000 operating cycles in $BF_3$ as the working gas and another set of four regulators were cycled over 350,000 times in silane as the working gas. Each cycle involved gas flow for from about 5 to 10 seconds to 10 minutes and required that the regulator subsequently close and seal. The average variation in regulator control was 6% and no significant issues were observed. The leak rate across the regulators was below $7 \times 10^{-6}$ atm-cc/hr.

The preferred interior positioning of the regulator in the gas source vessel avoids any release problems incident to any possible failure of the regulator, e.g., due to a diaphragm weld failure in the PSA. Such a failure would result in the loss of the calibration gas. Without the compensating force in the PSA, the regulator will fail in a "closed" state and result in a flow loss, so that the failure of the component is contained within the cylinder vessel, and occasions no loss or leakage of the gas from the vessel.

Figure 1:
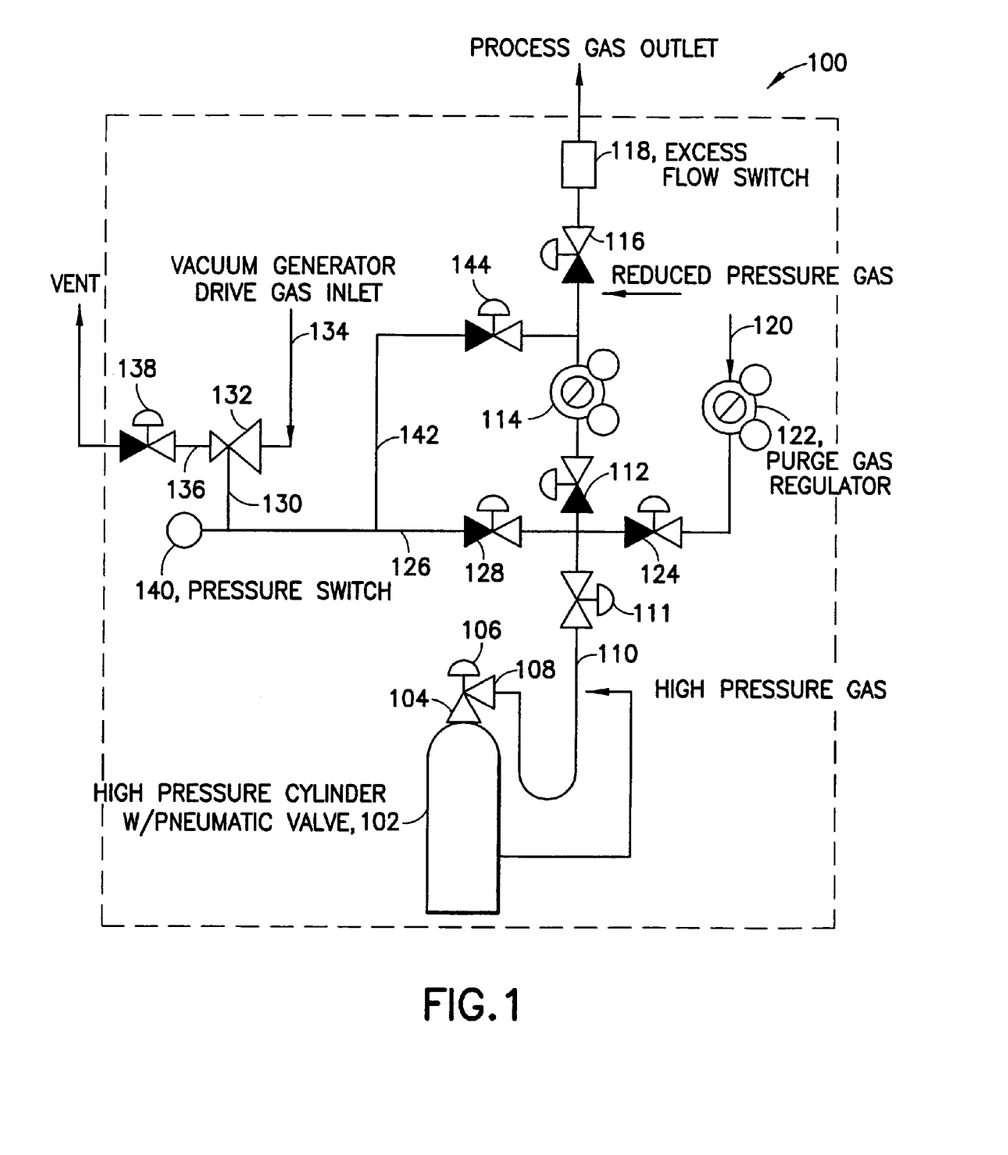
FIG. 1 is a schematic representation of a high-pressure gas cabinet, such as may be modified for enhanced safety operation in accordance with the present invention.

Referring now to the drawings, FIG. 1 is a schematic representation of a high-pressure gas cabinet, such as may be modified for enhanced safety operation in accordance with the present invention.

The gas cabinet is depicted schematically by the dashed line enclosure 100, and contains the high-pressure gas cylinder 102 and associated flow circuitry, valves, regulator flow switches, and related instrumentation and control means, wherein the flow circuitry and at least some of the aforementioned elements can be mounted on a gas cabinet panel, as a structural assembly positioned in the interior of the gas cabinet 100.

The high-pressure gas cylinder 102 is of a conventional type, having a valve head 104 with which is associated the valve hand wheel 106 and outlet port 108. The hand wheel 106 may alternatively be substituted by an automatic valve actuator, to provide automatic control of the valve in valve head 104, for dispensing of the high-pressure gas. In preferred practice, the cylinder valve desirably is a pneumatic valve, which provides the most control relative to other valve types, being openable and closable by means of a pressure switch. A manual valve is less preferred, since a technician or equipment operator is required to operate a manual control valve on the cylinder.

From the high-pressure gas cylinder, the high-pressure gas during dispensing operation flows through the valve in valve head 104, with the hand wheel 106 being open, so that the gas flows through discharge line 110, containing valves 112 and 116, regulator 114 and excess flow switch 118.

The gas discharge line 110 also is joined to manifold lines 126 and 120. The gas discharge line 110 contains manifold isolation valve 111, which is operable to isolate the gas manifold and vessel 102 from one another. Manifold line 126 contains flow control valve 128 therein, and manifold line 120 contains the purge gas regulator 122 and valve 124 therein.

The manifold includes a bypass line 142 containing valve 144 therein, as illustrated. The manifold further comprises a vacuum venturi assembly including vacuum generator drive gas inlet line 134 joined to venturi nozzle 132. Venturi nozzle 132 in turn is coupled with manifold line 126 via vacuum line 130. The venturi nozzle 132 at its outlet is joined to discharge line 136 containing valve 138 therein.

A pressure switch 140 is operatively coupled to manifold line 126.

In the FIG. 1 gas cabinet system, gas at superatmospheric pressure is dispensed from gas source vessel 102 in normal operation when the valve in valve head 104 is open, as previously described. The discharge line 110 contains regulator 114 for dispensing gas to a downstream process unit (not shown in FIG. 1) at a predetermined pressure determined by the set point of the regulator 114. The flow control valves 112 and 116 in discharge line 110 are open during such dispensing. The dispensing line 110 further contains the excess flow switch 118 to shut down the supply of superatmospheric gas, e.g., in the event that the volumetric flow rate of dispensed gas exceeds a predetermined value. The excess flow switch 118 alternatively may be arranged for actuation based on pressure or other property of the dispensed gas, rather than its volumetric flow rate. The excess flow switch thus offers a means for terminating flow of dispensed gas from the gas cabinet 100, in the event of failure of system componentry in the manifold flow circuitry.

By deploying a regulator 114 in the manifold downstream from the gas source vessel 102, the high-pressure gas initially dispensed into the gas cabinet manifold is dispensed at a predetermined reduced pressure in accordance with the set point setting of the regulator.

The manifold including flow lines and associated valves and other componentry, includes a vacuum generator circuit including the gas inlet line 134, venturi nozzle 132, discharge line 136, and associated vacuum suction line 130. In operation, flow of the drive gas, e.g., air, nitrogen, or other gas through the inlet line 134 and venturi nozzle 132 produces a suction in line 130 by means of which the manifold, by appropriate opening and closing of valves 124, 128, 144 and 116, is able to be evacuated, e.g., prior to change-out of the gas source vessel 102 when vessel 102 has been depleted of high-pressure gas.

The gas cabinet manifold also includes purging capability, in respect of purge gas feed line 120, by means of which, through appropriate opening and closing of valves 124, 128, 112, 116, 144 and 138, purge gas can be flowed through the gas manifold for removal of residual working gas from the piping, valving, etc. of the gas manifold.

The gas manifold contains pressure switch 140 which may be employed for effecting shut down of operation, or isolation of portions of the manifold, in response to sensed pressure level in the manifold.

The gas manifold of gas cabinet 100 therefore contains appropriate componentry for evacuating the manifold and purging same, in connection with change-out of the gas source vessel 102, or during maintenance or repair activities involving the gas manifold or its components.

Figure 2:
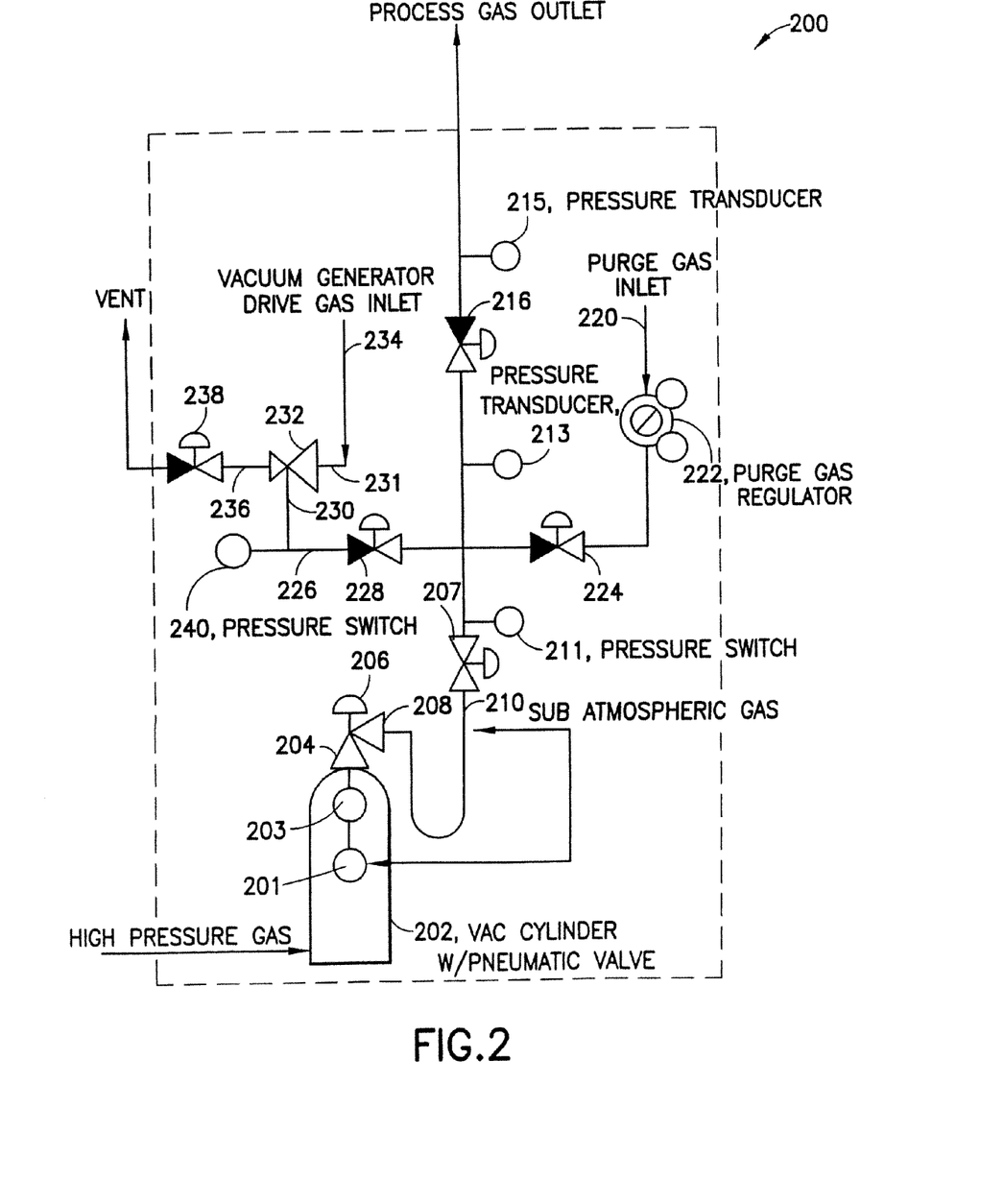
FIG. 2 is a schematic representation of a corresponding reduced pressure gas cabinet utilizing a sub-atmospheric pressure dispensed gas supplied by a pressure-regulated vessel, according to one embodiment of the invention.

FIG. 2 is a schematic representation of a reduced pressure gas cabinet providing a sub-atmospheric pressure dispensed gas from a pressure-regulated vessel, in accordance with one embodiment of the invention.

As illustrated in FIG. 2, the gas cabinet 200 contains a pressure-regulated gas source vessel 202 equipped with a valve head 204 containing a valve operatively coupled with valve operator element 206, for selective opening or closing of the valve, to initiate or terminate flow of gas at the outlet port 208. The valve is schematically shown with valve operator element 206, and in practice the valve in the valve head 204 is a pneumatic valve coupled with pneumatic actuator and operating means (not shown in FIG. 2).

The outlet port 208 of the valve head 204 contains a restricted flow orifice (RFO) in the throat of the cylinder outlet valve therein. This provides a measure of safety in the event that the cylinder valve is opened without being coupled to the dispensing manifold. An RFO may alternatively or additionally be deployed in the gas manifold, to provide such enhanced safety as part of the gas panel structure, and/or to match the stream of dispensed gas to the requirements of the downstream process being fed gas by the gas supply system.

Disposed in the interior volume that is enclosed by the wall of the gas source vessel 202, is a regulator assembly. The regulator assembly in this embodiment comprises series-coupled regulator units 201 and 203, through which gas at high pressure flows to the valve head 204 for flow through the valve operated by valve operator element 206, so that in the dispensing mode, gas flows from dispensing port 208 into process gas dispensing line 210. The gas dispensing line 210 contains manifold isolation valve 207, which is operable to isolate the gas manifold and vessel 202 from one another.

The pressure-regulated gas source vessel 202 thus contains a high-pressure gas, and the set points of the regulators 201 and 203 are set to dispense gas at a predetermined low pressure, e.g., sub-atmospheric pressure.

The gas dispensing line 210 contains pressure switch 211, as well as pressure transducers 213 and 215 on either side of flow control valve 216.

The gas dispensing line 210 is joined to manifold line 226 containing flow control valves 224 and 228. A pressure switch 240 is provided in communication with the manifold line 226. The manifold line 226 is coupled with the purge gas feed line 220 having a purge gas regulator therein, to provide purge gas as a predetermined pressure to the manifold, from a purge gas source (not shown in FIG. 2).

A vacuum generator circuit also is provided in the gas cabinet 200 shown in FIG. 2. The vacuum generator circuit includes drive gas feed line 234 coupling a source of drive gas (not shown) with the venturi feed line 231 of venturi 232. Venturi 232 discharges the drive gas in line 236, containing flow control valve 238 therein, to a vent, whereby the drive gas is exhausted exteriorly of the gas cabinet.

Venturi 232 is connected to a suction line 230 for drawing vacuum on manifold line 226. The purging of the manifold, subsequent to vacuum circuit evacuation thereof, is effected using a source of purge gas (not shown in FIG. 2). Such purge gas source is coupled with purge gas feed line 220, having purge gas regulator 222 therein, to introduce purge gas at a predetermined pressure to the manifold line 226.

By appropriate opening or closure of manifold valves 224, 228, 216 and 238, the system can be transitioned from (1) process gas dispensing to (2) evacuation of the manifold flow circuitry, to (3) purging of the manifold with the purge gas. The purge gas may be an inert gas, such as nitrogen, argon, helium, etc. Such sequence of operations (1)-(3) may take place as the active use of the gas source vessel is terminated, when the vessel contents are depleted to a predetermined extent. The vessel then is uncoupled from the manifold flow circuitry in the gas cabinet 200, and is changed out after manifold evacuation and purge steps are completed.

The pressure transducers 213 and 215 in the process gas dispensing line 210 are employed for monitoring the pressure of the dispensed gas. The flow rate of the dispensed gas can be modulated by means of flow control valve 216. The pressure transducers also may be coupled with process control means (not shown in FIG. 2), to control the gas cabinet operation in connection with changes in gas flows and operating pressures of dispensed gas in the gas cabinet.

The pressure switches 211 and 240 may be employed for alarm and/or shut-down purposes, in response to pressure levels in the process gas dispensing line 210 and manifold line 226, respectively.

While the regulator assembly in FIG. 2 has been illustratively shown as comprising two regulator units, coupled in a series arrangement, the number and placement of regulator devices within the interior volume of the gas source vessel, or at the valve head or dispensing port of the gas source vessel, may be varied in the practice of the invention, to provide any of different arrangements of the pressure-regulated gas source vessel.

The gas cabinet system shown in FIG. 2 has an advantage over the system shown in FIG. 1, in that the latter dispenses high-pressure gas directly into the manifold, for subsequent downstream modulation of pressure and flow rate to provide dispensed gas at the desired process conditions. The FIG. 2 system utilizes high pressure gas containment in the gas source vessel 202, as requisite to provide substantial capacity of the working gas (the capacity of vessel 202 increasing with increasing gas pressure), while the provision of the regulator assembly upstream of the dispensing valve in valve head 204 permits gas to be dispensed from the pre-regulated gas source vessel 202 at low, e.g., sub-atmospheric, pressure.

In consequence, the FIG. 2 system achieves a substantial improvement in safety and corresponding diminution of risk, relative to the FIG. 1 system.

Figures 3, 3B:
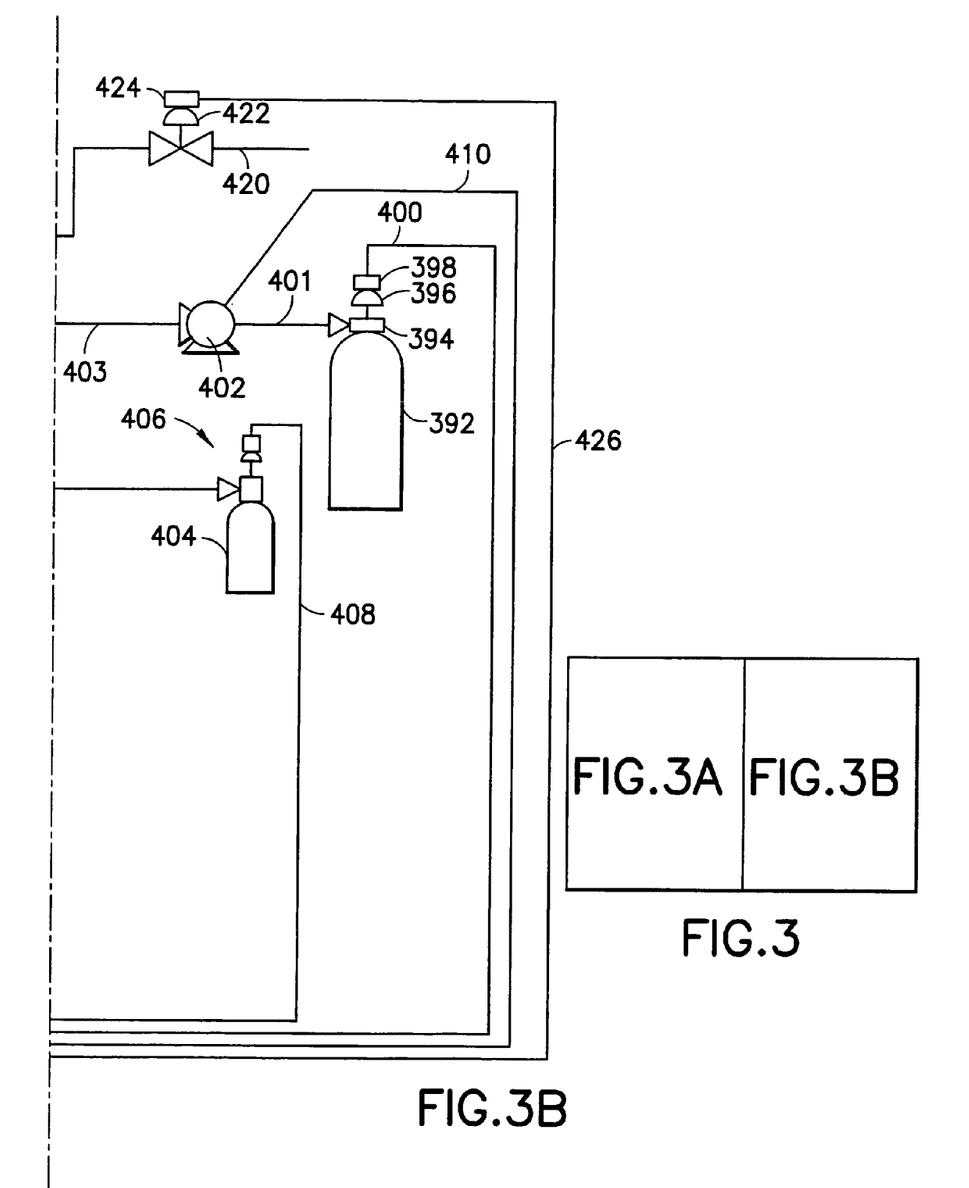
FIG. 3 is a schematic representation of a reduced pressure gas cabinet utilizing a low pressure dispensed gas supplied by a pressure-regulated vessel, and further regulated in the gas panel of the gas cabinet by a downstream sub-atmospheric pressure regulator, according to another embodiment of the invention.
Figure 3A:
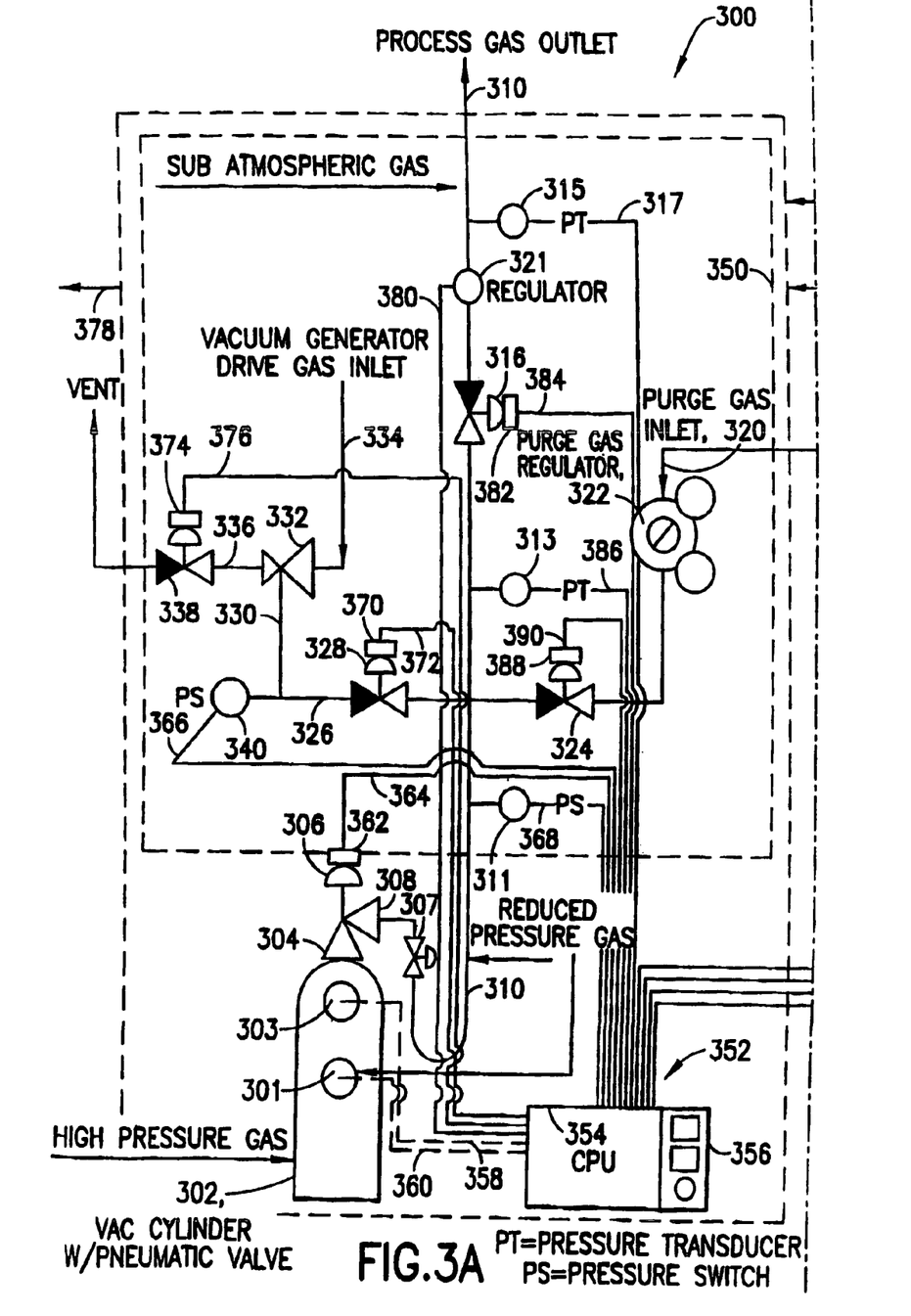

FIG. 3 is a schematic representation of a reduced pressure gas cabinet system utilizing a low-pressure dispensed gas supplied by a pressure-regulated vessel, and further regulated in the gas panel of the gas cabinet by a downstream sub-atmospheric pressure regulator, according to another embodiment of the invention.

The gas cabinet 300 as shown contains a gas panel 350 on which the gas manifold flow circuitry and associated elements are mounted.

The gas cabinet contains a pressure-regulated gas source vessel 302 containing a regulator assembly including regulator units 301 and 303, as shown. Gas source vessel 302 is equipped with valve head 304 containing a valve actuated by valve wheel 306 coupled to valve actuator 362. The valve actuator 362 is interconnected by the signal transmission line 364 to the central processing unit (CPU) 354 of electronics module 352.

The CPU, which may suitably be constituted by a computer, microprocessor-based device, programmable logic controller, or other microelectronic processing unit, is suitably deployed in or associated with the gas cabinet, and arranged for monitoring and/or controlling process conditions (gas pressure, temperature, flow rate and/or composition) of gas in the gas cabinet.

Although the gas cabinet is shown in FIG. 3 as having a single high-pressure gas source vessel 302, it will be recognized that the gas cabinet may employ more than one such vessel, and that the manifold in the gas cabinet may correspondingly be configured for switchover operation, so that when one gas source vessel coupled to the manifold is exhausted of gas, or reaches a predetermined low residual amount set point, the exhausted vessel is isolated by suitable valving operation in the manifold (e.g., closing of valve(s) in the gas feed line coupling the vessel to the manifold, while opening other valves in a gas feed line to couple another, full vessel in gas flow communication with the manifold), so that the spent vessel can be removed after the full vessel is brought on-line.

The valve head 304 of gas source vessel 302 illustrated in FIG. 3 has a discharge port 308 coupled to process gas dispensing line 310. The outlet port 308 of the valve head 304 contains a restricted flow orifice (RFO) in the throat of the cylinder outlet valve therein. Additionally, or alternatively, an RFO could be employed in the gas manifold, as discussed in connection with the FIG. 2 hereinabove.

The gas dispensing line 310 contains manifold isolation valve 307, which is operable to isolate the gas manifold and vessel 302 from one another. The process gas dispensing line 310 contains pressure switch 311 and pressure transducers 313 and 315. Intermediate the pressure transducers in this line is a flow control valve 316 that in turn is operatively coupled with a valve actuator 382 joined in signal transmission relationship with CPU 354 by means of signal transmission line 384.

The process gas dispensing line 310 also contains regulator 321 for dispensing gas at a reduced pressure level relative to the pressure level discharged from gas source vessel 302 (i.e., from port 308 to the process gas dispensing line 310). The regulator 321 is joined to CPU 354 by signal transmission line 380 for adjustment of the set point of the regulator. Alternatively, the regulator 321 may be a manually adjustable set point regulator, or a fixed set point device.

Concerning the gas source vessel 302 and regulator units 301 and 303 therein, FIG. 3 depicts such regulator units as schematically being responsive to CPU 354 by the dashed line representations 358 and 360. This denotes the operatively coupled relationship between the CPU and the respective regulator units 301 and 303, with respect to the set points of the regulator units. The regulator set points are independently adjustable by means of the CPU, which may for example generate a signal that is transmitted to the regulator units for adjustment of their pressure set points. The coupling of the regulator units with the CPU may involve signal transmission lines that pass into the interior volume of the vessel 302 for set point adjustment. Alternatively, the CPU may generate a signal modulating the adjustment mechanisms of each of the regulator units, to non-invasively change the set point settings of the regulators in the vessel.

Mounted on gas panel 350 is a manifold line 326 containing flow control valves 324 and 328 therein. Valve 324 is coupled with valve actuator 388, which in turn is joined to CPU 354 by signal transmission line 390. In like manner, flow control valve 328 is coupled to valve actuator 370, which is joined to CPU 354 by signal transmission line 372. The manifold line 326 is coupled to pressure switch 340, which in turn is joined to CPU 354 by signal transmission line 366. The manifold line 326 also communicates via suction line 330 with venturi 332. Venturi 332 is joined to a drive gas feed line 334 and to a drive gas discharge line 336 containing flow control valve 338 therein. The venturi discharge line 336 is arranged to vent the drive gas exteriorly of the gas cabinet 300.

Valve 338 in line 336 is coupled with valve actuator 374, which in turn is joined to CPU 354 by signal transmission line 376.

Manifold line 326 is connected to purge gas feed line 320 having purge gas regulator 322 therein. The purge gas feed line 320 is joined to a purge gas source 404 equipped with a valve head 406 including a valve actuator that is linked to CPU 354 by signal transmission line 408.

The gas cabinet 300 is provided with a ventilation capability, which may for example involve a louvered door of the gas cabinet through which air or other ventilation gas may flow and be vented from the gas cabinet, e.g., in vent line 378. The gas cabinet may be ventilated in a conventional manner, involving for example a blower/fan assembly on the roof of the semiconductor processing facility that is arranged to draw building air through the louvers in the cabinet door and the interior volume of the gas cabinet to the vent line 378 and through ductwork to the roof of the facility, with the exhaust being flowed through a wet scrubber for abatement of any toxic or otherwise hazardous components therein.

Alternatively, the gas cabinet can be ventilated by ventilation gas line 420 containing valve 422 therein. Valve 422 is coupled with valve actuator 424 for operation of the valve 422 to control the flow rate of ventilation gas flowed through the gas cabinet. The valve actuator 424 in turn is coupled with CPU 354 via signal transmission line 426, whereby the valve 422 can be modulated by the CPU in response to monitored conditions in the gas cabinet, to vary the flow rate of ventilation gas in a controlled manner. The ventilation line 420 may be coupled with a blower for effecting air flow through the gas cabinet, e.g., using clean dry air as the ventilating gas.

As a result of the capability of the pressure-regulated vessel in the practice of the invention to contain a substantially greater quantity of gas than a correspondingly sized vessel lacking pressure regulation in or at the vessel, while at the same time providing an enhanced safety lower pressure dispensing of gas from the gas cabinet to the downstream semiconductor process (relative to the high pressure gas in the storage and dispensing vessel). This characteristic provides for higher deliverables per cylinder and fewer cylinder change-outs over time.

Additionally, the gas cabinet may be smaller in size, since an equivalent low pressure vessel holding the same inventory of gas would be much larger in size, and would necessitate a correspondingly larger gas cabinet, whose increased volume would in turn require a larger flow of ventilating gas through the larger gas cabinet, etc. The invention therefore provides an exhaust reduction/minimization benefit. Cabinet ventilation requirements are generally based on prescriptive considerations (e.g., in the case of silane dispensing, a certain flow rate and linear velocity of ventilating gas through the gas cabinet is mandated), or alternatively are based on the objective of containing gas releases such that workers in proximity to the gas cabinet are not exposed to specified concentrations of the gas being dispensed, e.g., above 25% of the threshold limit value (TLV). For toxic gases as the dispensed fluid, tests such as the Semi F-15 Tracer Gas Test may be employed to set the ventilation level, wherein a surrogate gas such as $SF_6$ is released at a worst case release (WCR) rate, and the cabinet ventilation rate then is adjusted so as to maintain the concentration of the toxic gas in front of the cabinet at a concentration of 25% of the TLV.

The worst case release rate for a gas containing vessel depends on the pressure of the contained gas and the size of the restricted flow orifice that is employed on the vessel (e.g., on the gas discharge port of the valve head on the vessel). The pressure-regulated vessel of the invention, as a result of its pressure regulation provides a lower WCR rate, and therefore the gas cabinet can be exhausted at a lower rate than would be required in a corresponding release of gas at a higher pressure. Therefore, exhaust air (or other ventilation gas) costs can be decreased in the practice of the invention.

NFPA 318 Guidelines for Cleanrooms 2000 establishes a criterion for silane and other pyrophoric gases based on maintaining the minimum dilution at 25% of the lower explosive limit (LEL) of the gas. By way of example, for a high pressure silane gas cylinder using a 0.010 inch restricted flow orifice at the discharge port of the valve head of such vessel, the recommended minimum exhaust flow rates are nominally 340 cubic feet per minute (CFM) at 800 psig internal cylinder pressure, 600 CFM at 600 psig internal cylinder pressure, and 765 CFM at 1500 psig internal cylinder pressure. The Compressed Gas Association (CGA) Guidelines [P-32-2000] on minimum exhaust are similarly based.

The present invention by provision of a pressure-regulated gas storage and dispensing vessel therefore yields a substantial reduction in exhaust gas requirements, relative to a corresponding gas dispensing system lacking the pressure-regulation feature of the present invention.

As a still further alternative, the ventilation gas line 420 may be joined to a nitrogen source, e.g., a "house gas" nitrogen gas line in the semiconductor process facility, to flow nitrogen gas through the gas cabinet, as the ventilation gas therefor.

The gas cabinet 300 may also be provided with a gas introduction capability by an external gas source 392 comprising a vessel containing the gas species of interest. The external gas source is equipped with a valve head 394 containing an interior valve operated by valve wheel 396 coupled to valve actuator 398. The valve actuator 398 is coupled with CPU 354 by signal transmission line 400.

The external gas source 392 is arranged for dispensing of the contained gas from the vessel through valve head 394 at its discharge port, into discharge line 401. Discharge line 401 is coupled to gas pump 402, which pumps gas in inlet line 403 to the gas cabinet 300. In this manner, the externally supplied gas enters the gas cabinet and flows through the interior volume of the gas cabinet for egress therefrom, e.g., through gas discharge line 378. Pump 402 is coupled with the CPU 354 by means of signal transmission line 410.

The external gas source 392 may provide a specialty gas for periodic maintenance of the interior of the gas cabinet, e.g., for cleaning, disinfection, etc. Alternatively, the specialty gas may be a reactive gas that reacts with any leakage material deriving from vessel 302, e.g., leaking from a valve head of the vessel, or a fitting or coupling in the gas cabinet, etc., when the presence of the dispensed gas from vessel 302 is detected in the ambient environment within the gas cabinet 300. As a still further alternative, the specialty gas may comprise a safety gas, e.g., a fire suppressant gas, when a pyrophoric gas is being dispensed in the gas cabinet, and leakage of same is detected.

The process gas dispensing line 310 contains pressure switch 311 coupled with CPU 354 by signal transmission line 368. The dispensing line also contains pressure transducers 313 and 315, which likewise are coupled to the CPU, by signal transmission lines 386 and 317, respectively.

It will be appreciated that the system componentry in the FIG. 3 system is integrated, being operatively coupled with the CPU 354 of the electronics module 352, for integrated process control of the system. The electronics module 352 includes an alarm unit 356 operatively coupled with the CPU 354, so that operation outside of predetermined set point limits is translated by the CPU to appropriate audio and/or visual alarms outputted at the alarm unit 356.

The CPU 354 thus may be programmatically constructed and arranged to carry out a cyclic operation, involving dispensing of gas from the gas cabinet in process gas dispensing line 310. Such dispensing may be conducted at predetermined set point conditions for the interior regulators 301 and 303, to provide reduced pressure gas to the dispensing line 310. The set points of the regulator units are adjustable by the CPU 354. The operating cycle may include termination of the dispensing function upon depletion of the gas in the gas source vessel, followed by evacuation of the manifold by the venturi 332, after which the manifold is purged with purge gas from purge gas source 404. The cyclic operation therefore may be accommodated by the CPU programmatically opening and closing valves and otherwise effectuating the respective operational steps of the gas cabinet operation. The pressure transducers 313 and 315 may be operatively coupled to the CPU by the respective signal transmission lines 386 and 317 in such manner as to continuously monitor pressure conditions in the dispensing line 310 upstream of flow control valve 316 and downstream of regulator 321. The flow control valve 316 may itself be modulated by the CPU to provide a desired flow rate of process gas to the downstream semiconductor processing tool or other gas-using equipment or location. The set point of regulator 321 may be adjusted by CPU 354 by appropriate control signal through signal transmission line 380, whereby the process gas dispensed from the gas cabinet is of a desired pressure characteristic.

The pressure switches 311 and 340 are likewise linked to the CPU in signal transmission relationship, whereby automatic shutdown of the gas cabinet system may be effected, if operation is outside of predetermined limits for pressure levels in the manifold line or process gas dispensing line.

During vacuum evacuation of the manifold, the level of suction exerted by venturi 332 on manifold line 326 and suction line 330 may be selectively modulated, by corresponding actuation of the valve actuator 374 of flow control valve 338. The valve actuator 374 is linked in signal controlling relationship with the CPU 354 via signal transmission line 376.

Similarly, the purge gas supply may be modulated by an appropriate signal from the CPU, as sent to the valve actuator of valve head assembly 406 in signal transmission line 408. The purge gas is regulated to a desired pressure level by regulator 322 in the purge gas feed line 320. Although not shown, the set point of purge gas regulator 322 may be selectively adjusted, by coupling regulator 322 with CPU 354, in corresponding manner to the connection of CPU 354 to regulator 321.

The flow rate of ventilation gas introduced to the gas cabinet 300 and exhausted therefrom in vent line 378 may be selectively modulated, by adjusting the speed of pump 402 under control of the CPU, and/or by modulating the dispensing valve of ventilation gas source vessel 392.

For example, the CPU may respond to a sudden diminution of pressure in the process gas dispensing line, e.g., due to a leak upstream in the gas manifold flow circuitry, as sensed by pressure transducer 315, and signaled to CPU 354 via signal transmission line 317, by increasing the flow rate of ventilation gas through the gas cabinet. In this manner, the leaking gas is reduced in concentration to below its lower toxic or hazardous concentration, by "sweeping out" the interior volume of the gas cabinet with the ventilation gas.

It will be recognized that the FIG. 3 gas cabinet system may be varied in character, i.e., be differently configured and operated, to provide high safety operation in a variety of conformations and operational forms. For example, the manifold pressure may be sensed and used to actuate pressure switch 340 by signal transmission in line 366, so that the dispensing valve in valve head 304 of gas source vessel 302 is closed. This may be effected by a control signal from CPU 354 transmitted in the signal transmission line 364 to valve actuator 362, causing it to close valve wheel 306. In this fashion, the gas source vessel 302 is isolated when the gas supply manifold pressure exceeds a predetermined pressure limit. The valve in valve head 304 may also be controlled so that dispensing does not occur unless pressure in the dispensing line 310 is at a specific value, as sensed by pressure transducer 313 or pressure transducer 315, for example.

The FIG. 3 system thus provides a process gas dispensing arrangement wherein the gas is contained in vessel 302 at high pressure, to maximize the inventory of gas in the vessel, with the pressure regulators serving to provide dispensed gas from the vessel to the dispensing line at a substantially lower pressure, which may be modulated (reduced) still further by the dispensing line regulator 321.

The gas in the high-pressure gas source vessel 302 may be at a superatmospheric pressure, such as in a range of from 20 psig to 2000 psig, while the dispensed gas discharged from the pressure-regulated vessel is at a substantially lower pressure (reduced by at least 25%, preferably at least 40%, more preferably at least 60%, and most preferably at least 80%, relative to the pressure level in the interior volume of the gas source vessel).

The dispensed gas discharged from the pressure-regulated vessel has a pressure that may for example be in a range of from about 20 Torr to 1200 psig, and below the pressure of the gas in the container portion of the gas source vessel. The dispensed gas in sub-atmospheric pressure dispensing operation can be in a pressure range of from about 20 Torr to about 750 Torr, and is more typically in a range of from about 400 to about 600 Torr. Preferred pressure ranges of the gas dispensed into the gas manifold from the gas source vessel include a range of from about 20 Torr to about 200 psig, and more preferably from about 20 Torr to about 100 psig. The pressure of the gas dispensed from the pressure-regulated vessel may for example be in a pressure range on the order of from about 20 Torr to about 200 psig, or more preferably in a range of from about 400 Torr to about 100 psig, and the CPU may be programmatically arranged so that pressure set point of the high-pressure alarm in alarm unit 356, for triggering of a system shutdown, is from about 10 to about 20 psig above the selected operating pressure of the dispensed gas.

In a further embodiment, the high-pressure gas in the gas source vessel 302 may be modulated to an intermediate pressure level by the regulator associated with the vessel (interiorly disposed therein, or provided at the neck or valve head, upstream of the dispensing valve for the vessel). Such intermediate pressure then is further reduced by the pressure regulator 321 in the dispensing line, so that final pressure of the gas transmitted in dispensing line 310 to the downstream process tool or use location, is at a desired pressure level appropriate to such end use of the gas.

The invention therefore enables the safe character of the gas cabinet system to be substantially increased, and the risks and dangers attendant high-pressure gas dispensing to be substantially reduced.

As mentioned herein in the Summary of the Invention section hereof, the invention may be carried out in various modes, including (1) dispensing of superatmospheric pressure gas, (2) dispensing of sub-atmospheric pressure gas, and (3) hybrid operation involving dispensing of gas at superatmospheric pressure that is further regulated down to subatmospheric pressure, variously described hereinabove. Each of these modes is discussed in turn below, as regards preferred operating conditions, in an illustrative embodiment for each mode.

In mode (1) involving superatmospheric pressure dispensing operation, the pressure-regulated gas source vessel is arranged to deliver gas at 100 psig, with a restricted flow orifice disposed in the outlet port of the valve head of the vessel that is selected to match the process requirements (of the downstream semiconductor process) at 1.5 times the maximum flow. A pneumatic valve is provided on the vessel, and the vessel is coupled with a gas panel including a regulator of the variable set point type, wherein the set point is set to match factory delivery requirements, typically 30-70 psig. An alarm and control assembly is provided that functions to close the pneumatic valve on the vessel, as well as the manifold isolation valve, and to emit alarm output. The alarm and control system may also be constructed and arranged to activate a two-position gas cabinet damper to increase exhaust flux through the gas cabinet. An auto-switch system may also be employed in a multiple gas source vessel arrangement, to effect changes in bringing a back-up gas source vessel on-line, when another on-stream gas source vessel becomes depleted of gas.

In mode (2) involving sub-atmospheric pressure dispensing operation, the pressure-regulated gas source vessel is arranged to deliver gas at 650 torr, with a restricted flow orifice disposed in the outlet port of the valve head of the vessel that is selected to match the process requirements (of the downstream semiconductor process) at 1.5 times the maximum flow. A pneumatic valve is provided on the vessel, and the vessel is coupled with a gas panel including a regulator of the variable set point type, wherein the set point of the gas panel regulator is typically set at about 400-600 Torr. An alarm and control assembly is provided that functions to close the pneumatic valve on the vessel, as well as the manifold isolation valve, and to emit alarm output. The alarm and control system may also be constructed and arranged to activate a two-position gas cabinet damper to increase exhaust flux through the gas cabinet. An auto-switch system may also be employed in a multiple gas source vessel arrangement, to effect changes in bringing a back-up gas source vessel on-line, when another on-stream gas source vessel becomes depleted of gas.

In mode (3) involving hybrid superatmospheric pressure dispensing operation that is further regulated by a gas panel regulator to produce sub-atmospheric pressure gas for dispensing, the pressure-regulated gas source vessel is arranged to deliver gas at a pressure of 10-100 psig, with a restricted flow orifice disposed in the outlet port of the valve head of the vessel that is selected to match the process requirements (of the downstream semiconductor process) at 1.5 times the maximum flow. A pneumatic valve is provided on the vessel, and the vessel is coupled with a gas panel including a regulator of the variable set point type, wherein the set point is set at about 600 Torr. An alarm and control assembly is provided that functions to close the pneumatic valve on the vessel, as well as the manifold isolation valve, and to emit alarm output. The alarm and control system may also be constructed and arranged to activate a two-position gas cabinet damper to increase exhaust flux through the gas cabinet. An auto-switch system may also be employed in a multiple gas source vessel arrangement, to effect changes in bringing a back-up gas source vessel on-line, when another on-stream gas source vessel becomes depleted of gas.

The hybrid mode (3) allows limited pressure operation in the manifold, which can be utilized to overcome pressure drops associated with point of use (POU) gas purifiers, with delivery from the gas cabinet to the semiconductor process tool and the VMB at sub-atmospheric pressure.

The features and advantages of the present invention are more fully shown by the following non-limiting examples.

EXAMPLE 1

Using Fault Tree methodology, "pre-regulated" VAC® cylinders (ATMI, Inc., Danbury, Conn.) having interiorly disposed regulators were compared with standard high pressure cylinders in silane service. Gas cabinet installations were identical and corresponding fault trees were constructed and risk analysis completed. The potential release scenarios $[S_i]$ numbered over 20 for each comparison and many involved multiple failures for a release to occur. In this manner an overall frequency of occurrence was determined, risks calculated and the delivery methods compared on a relative basis.

The likelihood of incidents is affected by cylinder replacement frequency and delivery pressure. The consequence of operational incidents or worst case release rate [WCR]—is shown in Table 1 and ranges from 30.5 to 70.8 standard liters per minute (slpm) (NFPA 318 Standard for the Protection of Cleanrooms, 2000 Edition). The WCR for the pre-regulated cylinder was capped at 8.2 slpm and for all fill pressures.

TABLE 1

Silane Flow Rates Through a 0.010" Restricted Flow Orifice as a Function Of Cylinder Pressure

| Pressure [psig] | WCR Flow [slpm] | Mass [kg] |
|---|---|---|
| 1600 | 70.8 | 15 |
| 1200 | 55.7 | 12 |
| 800 | 30.5 | 5 |

EXAMPLE 2

Silane Delivery

Comparative Example

Pre-regulating pressure was set to fix a constant delivery pressure for the pre-regulated gas source vessel, which was independent of fill pressure. Silane fill densities are a function of risk tolerance; about half of the fills in this test were 5 kg fills, with the remainder of the fills spread between 10 kg, 12 kg and 15 kg charges of fluid to the vessel. Table 2 below sets out the silane worst case release rates at 800 psig and 100 psig, wherein VAC refers to a pre-regulated gas storage and dispensing vessel commercially available from ATMI, Inc. (Danbury, Conn.).

TABLE 2

Silane Worst Case Release Rates at 800 psig and 100 psig

| Cylinder | Pressure | Capacity | RFO | Release Rate |
|---|---|---|---|---|
| Standard | 800 psig | 5 kg | 0.010" | 30.5 slpm |
| VAC | 100 psig | 15 kg | 0.010" | 3.5 slpm |
| [1600 psig] | 100 psig | 15 kg | 0.014" | 6.9 slpm |

Table 3 below sets out the results of relative risk analysis for silane delivery options.

TABLE 3

| Gas Delivery System | Frequency | Consequence | Risk | Risk Ratio |
|---|---|---|---|---|
| 15 kg, VAC (100 psig) | 4.44E−3 | 8.2 | 3.64E−2 | 1 |
| 5 kg, 800 psig | 1.49E−2 | 30.5 | 4.54E−1 | 12.5 |
| 10 kg, 1200 psig | 1.27E−2 | 55.0 | 6.98E−1 | 19.2 |
| 15 kg, 1550 psig | 1.16E−2 | 70.8 | 8.21E−1 | 22.6 |

On a relative risk basis, the VAC® delivery system [100 psig] was predicted to be 12 to 23 times safer than a standard silane cylinder equipped with an 0.010" restrictive flow orifice (RFO). The lower release rate [consequence] term for a given incident, a function of delivery pressure, provides this result.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art. The invention therefore is to be broadly construed, consistent with the claims hereafter set forth.

What is claimed is:

1. A gas supply manifold arranged to receive discharged gas from a pressure-regulated gas source vessel, wherein the gas supply manifold is isolatable from the pressure-regulated gas source vessel when a predetermined occurrence is detected in the gas supply manifold wherein the pressure-regulated gas source vessel comprises an interior volume, and a gas regulator or a series-arranged assembly of gas regulators is in said interior volume to regulate gas dispensing from the vessel.

2. The gas supply manifold of claim 1, wherein the predetermined occurrence is detected using a property of the dispensed gas.

3. The gas supply manifold of claim 1 wherein the predetermined occurrence is an increase in pressure occurrence.

4. The gas supply manifold of claim 1, wherein the predetermined occurrence is a diminution of pressure in the gas supply manifold.

5. The manifold of claim 1, wherein the predetermined occurrence is selected from the group consisting of a high pressure occurrence, a diminution of pressure occurrence and a volumetric flow rate occurrence.

6. The gas supply manifold of claim 5, wherein the predetermined occurrence is a high pressure occurrence.

7. The gas supply manifold of claim 1, wherein a single gas regulator is in said interior volume to regulate gas dispensing from the vessel.

8. The gas supply manifold of claim 7, wherein the gas regulator has a dispensing pressure set point that is in a range of from 10 psig to 100 psig.

9. The gas supply manifold of claim 8, wherein the gas regulator has a dispensing pressure set point that is adjustable.

10. The gas supply manifold of claim 7, wherein the gas regulator comprises a pressure-responsive diaphragm that is arranged to react to a downstream pressure in the manifold and to responsively regulate flow of gas from the gas source vessel.

11. The gas supply manifold of claim 7, wherein the pressure-regulated gas source vessel contains a semiconductor processing gas.

12. The gas supply manifold of claim 11, wherein the semiconductor processing gas is selected from the group consisting of gases for manufacturing semiconductor devices and precursor structures therefor, gases for cleaning process chamber's and flow circuitry, and gases for abatement of the effluent streams from a semiconductor manufacturing operations.

13. The gas supply manifold of claim 11, wherein said semiconductor processing gas comprises a gas species selected from the group consisting of boron trifluoride, silanes, methylsilane, trimethylsilane, arsine, phosphine, diborane, chlorine, boron trichloride, $B_2D_6$, tungsten hexafluoride, hydrogen fluoride, hydrogen chloride, hydrogen iodide, hydrogen bromide, germane, ammonia, stibine, hydrogen sulfide, hydrogen selenide, hydrogen telluride, nitrogen trichloride, silicon tetrafluoride, organometallic compounds, hydrocarbon gases, hydrogen, methane, nitrogen, carbon monoxide, and rare gas halides.

14. The gas supply manifold of claim 1, wherein a series-arranged assembly of gas regulators is in said interior volume to regulate gas dispensing from the vessel.

15. The gas supply manifold of claim 7, wherein the manifold and the pressure-regulated gas source vessel are disposed in a gas cabinet.

16. The gas supply manifold of claim 15, wherein the gas cabinet comprises a damper to exhaust flux through the gas cabinet.

17. The gas supply manifold of claim 15, further comprising a control system constructed and arranged to activate the gas cabinet damper to modify exhaust flux therethrough when the predetermined occurrence is detected in the gas supply manifold.

18. The gas supply manifold of claim 7, further comprising a system controller to initiate an auto-shutdown step when the predetermined occurrence is detected in the gas supply manifold.

19. The gas supply manifold of claim 7, further comprising at least one component selected from the group consisting of: (i) a vacuum circuit operable to effect evacuation of at least part of the gas supply manifold; (ii) a purge gas circuit operable to effect purging of at least part of the gas supply manifold; (iii) at least one flow control valve in the gas supply manifold; (iv) at least one pressure sensor in the gas supply manifold; (v) at least one pressure switch in the gas supply manifold; and (vi) at least one regulator in the gas supply manifold.

20. The gas supply manifold of claim 7, further comprising an electronics module, wherein said manifold is valved, including valves that are selectively adjustable, and at least one of said valves is operatively coupled to the electronics module for adjustment thereof in operation of the manifold.

21. The gas supply manifold of claim 7, wherein the gas supply manifold is operatively coupled to a multiplicity of pressure-regulated gas source vessels.

22. The gas supply manifold of claim 7, wherein the gas manifold is constructed and arranged for removal of gas therefrom to enable change-out of the gas source vessel when the vessel has become depleted of gas.

23. The gas supply manifold of claim 7, adapted to operate at pressure therein in a range of from sub-atmospheric pressure to about 1200 psig.

24. The gas supply manifold of claim 7, comprising at least one of the following components: (i) a vacuum circuit operable to effect evacuation of at least part of the gas supply manifold; (ii) a purge gas circuit operable to effect purging of at least part of said gas supply manifold (d); (iii) at least one flow control valve in said gas supply manifold; (iv) a pressure sensor in said gas supply manifold; (v) a pressure switch in said gas supply manifold; and (vi) a regulator in said gas supply manifold;

and
an electronics module including a central processing unit (CPU) that is constructed and arranged for controlling at least one of said comprised components (i)-(vi).

25. The gas supply manifold of claim 7, wherein the manifold is arranged to dispense gas to a semiconductor processing ion implantation unit.

26. The gas supply manifold of claim 7, further comprising an excess flow switch for controlling flow of gas through the manifold when volumetric flow rate of dispensed gas exceeds a predetermined value.

27. The manifold of claim 5, wherein the predetermined occurrence is a diminution of pressure occurrence.

28. A system comprising the manifold of claim 1 and a gas source vessel.

29. The system of claim 28, wherein the gas source vessel contains a gas for semiconductor processing.

30. A gas supply manifold arranged to receive discharged gas from a pressure-regulated gas source vessel, wherein the gas supply manifold is isolatable from the pressure-regulated gas source vessel when a predetermined occurrence is detected in the gas supply manifold, wherein the predetermined occurrence is detected by volumetric flow rate of dispensed gas.

31. The gas supply manifold of claim 30, wherein the gas source vessel comprises a pressure regulator deployed at or within the vessel.

32. A gas supply manifold arranged to receive discharged gas from a pressure-regulated gas source vessel, wherein the gas supply manifold is isolatable from the pressure-regulated gas source when a gas is detected in the gas supply manifold at a pressure exceeding a predetermined pressure, wherein the pressure-regulated gas source vessel comprises an interior volume, and a gas regulator or a series-arranged assembly of gas regulators is in said interior volume to regulate gas dispensing from the vessel.

33. The gas supply manifold of claim 32, wherein a shut down event occurs when the gas supply manifold pressure exceeds the predetermined pressure.

34. The gas supply manifold of claim 32, wherein the pressure-regulated gas source vessel comprises a valve.

35. The gas supply manifold of claim 32, wherein the pressure-regulated gas source vessel comprises a pneumatic valve.

36. The gas supply manifold of claim 35, wherein the gas supply manifold is isolated from the pressure regulated gas source by closing the valve.

37. The gas supply manifold of claim 36, wherein the gas supply manifold is isolated from the pressure regulated gas source by closing the pneumatic valve.

38. The gas supply manifold of claim 37, wherein the pneumatic valve is closed by a valve actuator in signal transmission communication with a control signal from a CPU.

39. The gas supply manifold of claim 32, further comprising an isolation valve on the manifold.

40. The gas supply manifold of claim 39, wherein the isolation valve on the manifold is a high pressure isolation valve.

41. The gas supply manifold of claim 39, wherein the gas supply manifold is isolated from the pressure regulated gas source by closing the isolation valve on the manifold.

42. The gas supply manifold of claim 34, further comprising an isolation valve on the manifold.

43. The gas supply manifold of claim 42, wherein the gas supply manifold is isolatable at the pressure-regulated gas source vessel valve or at the isolation valve on the manifold.

44. The gas supply manifold of claim 41, wherein the gas supply manifold is isolatable at both the pressure-regulated gas source vessel and at the isolation valve on the manifold.

45. The gas supply manifold of claim 32, further comprising an alarm.

46. The gas supply manifold of claim 45, wherein the alarm is selected from the group consisting of visual and audio.

47. The gas supply manifold of claim 32, wherein an alarm is actuated when gas is detected in the gas supply manifold at a pressure exceeding the predetermined pressure.

48. The gas supply manifold of claim 32, further comprising a system controller to initiate an auto-shutdown step when gas is detected in the gas supply manifold at or above the pressure exceeding a predetermined pressure, wherein the auto-shutdown step is at least one step selected from the group consisting of, closing a valve on the gas source vessel, closing an isolation valve on the gas supply manifold, and actuating an alarm.

49. The gas supply manifold of claim 32, wherein the predetermined pressure is between 0 and 5 psig.

50. The gas supply manifold of claim 35, wherein the pneumatic valve does not open unless a negative pressure is established in the gas supply manifold.

51. The gas supply manifold of claim 32, wherein the gas source vessel is operable at a subatmospheric pressure.

52. The gas supply manifold of claim 32, wherein the gas source vessel is operable at a pressure between about 20 Torr to about 200 psig.

53. The gas supply manifold of claim 52, wherein the predetermined pressure is from 10-20 psig above the operable pressure.

54. The gas supply manifold of claim 32, wherein the pressure-regulated gas source has an internal pressure between 20 Torr and 1200 psig.

55. The gas supply manifold of claim 32, wherein a pressure switch detects the pressure in the gas supply manifold.

56. The gas supply manifold of claim 32, wherein a flow control valve detects the pressure in the gas supply manifold.

57. The gas supply manifold of claim 32, wherein a pressure transducer detects the pressure in the gas supply manifold.

58. The gas supply manifold of claim 32, wherein the pressure of the gas discharged into the gas supply manifold is at a pressure selected from the group consisting of super-atmospheric pressure, sub-atmospheric pressure, and super-atmospheric pressure that is further regulated down to a sub-atmospheric pressure.

59. The gas supply manifold of claim 32, wherein the pressure regulated gas source vessel comprises a restricted flow orifice disposed in an outlet port of the vessel.

60. The gas supply manifold of claim 32, wherein the gas supply manifold and the pressure regulated gas source vessel are disposed in a gas cabinet.

61. The gas supply manifold of claim 60, wherein the gas cabinet comprises a damper to exhaust flux through the gas cabinet.

62. The gas supply manifold of claim 61, further comprising a control system constructed and arranged to activate the gas cabinet damper to modify exhaust flux therethrough when gas is detected in the gas supply manifold at a pressure exceeding a predetermined pressure.

* * * * *